No. 672,936. Patented Apr. 30, 1901.
F. W. GARRETT.
CONTROL OF ELECTRIC MOTORS.
(Application filed Aug. 28, 1900.)
(No Model.) 2 Sheets—Sheet 1.

WITNESSES:
INVENTOR
BY
his ATTORNEY.

UNITED STATES PATENT OFFICE.

FRANK W. GARRETT, OF JOHNSTOWN, PENNSYLVANIA, ASSIGNOR TO THE LORAIN STEEL COMPANY, OF PENNSYLVANIA.

CONTROL OF ELECTRIC MOTORS.

SPECIFICATION forming part of Letters Patent No. 672,936, dated April 30, 1901.

Application filed August 28, 1900. Serial No. 28,324. (No model.)

*To all whom it may concern:*

Be it known that I, FRANK W. GARRETT, of Johnstown, in the county of Cambria and State of Pennsylvania, have invented a new and useful Improvement in Control of Electric Motors, of which the following is a full, clear, and exact description, reference being had to the accompanying drawings, which form a part of this specification.

My invention has relation to the control of electric motors, and is designed to provide a method of series-parallel control for two motors in which the change from full series to full parallel is effected without the use of external resistance and by a series of steps designed to provide a more even distribution of speed acceleration and also to obviate any tendency of the motors to "buck" under certain conditions.

My invention consists generally in a method of control in which the motors are changed from series to parallel relation by first connecting their field-coils in parallel, with their armatures in series with each other and with the parallel fields, then shifting the connection of one of the motors to place its armature in shunt to the other motor and its field in series with said motor, and then connecting the two motors as a whole in parallel.

My invention also consists in the novel step in the control of electric motors which consists in connecting the fields of both motors and the armature of one motor in series and placing the armature of the other motor in parallel with the first motor; also, in the succeeding step, which consists in disconnecting the first motor from circuit and reconnecting it in parallel with the other motor.

My invention also consists in the novel method of control, all as hereinafter described, and pointed out in the appended claims, reference being had to the accompanying drawings, in which—

Figure 1:
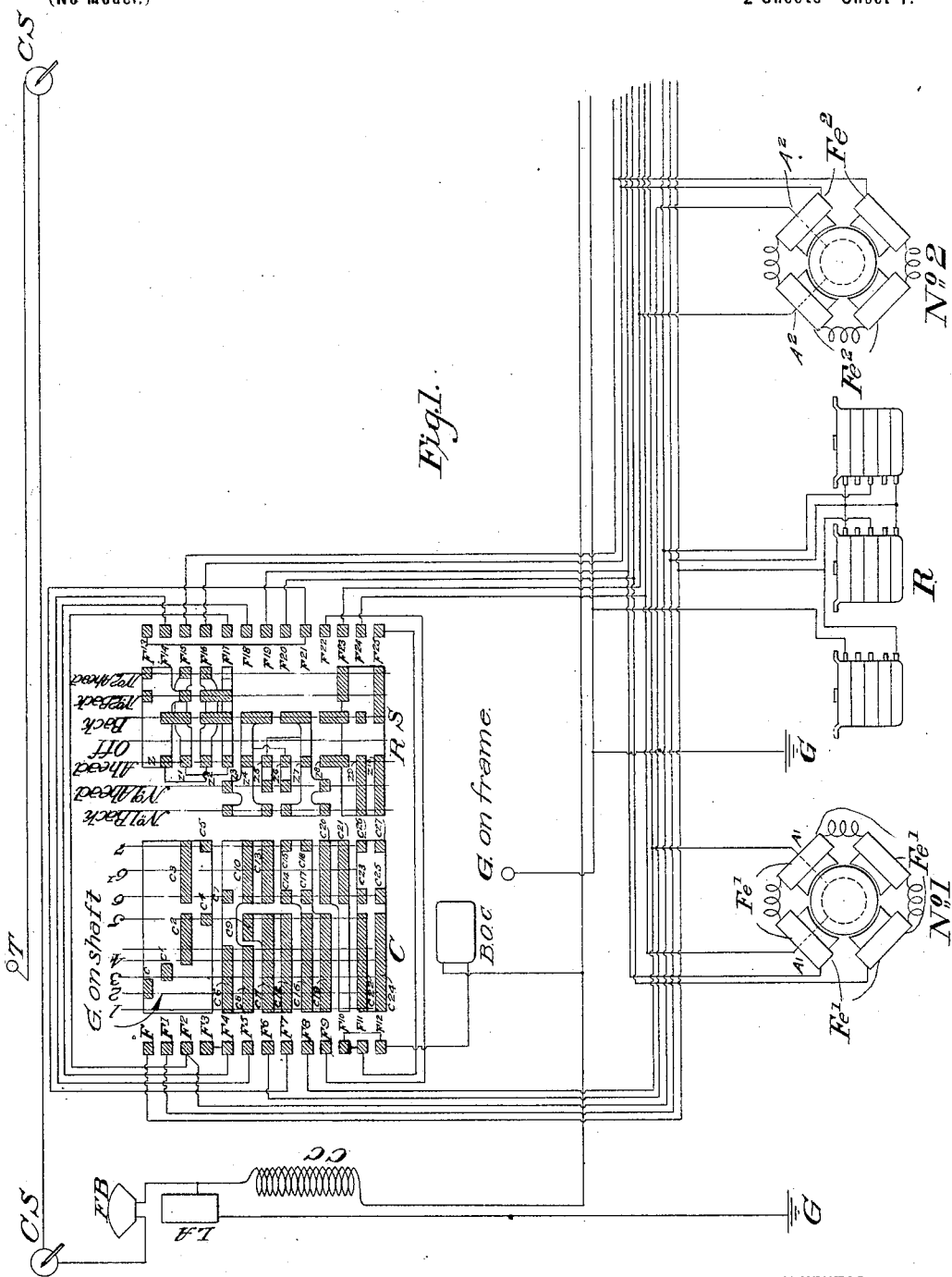
Figure 2:
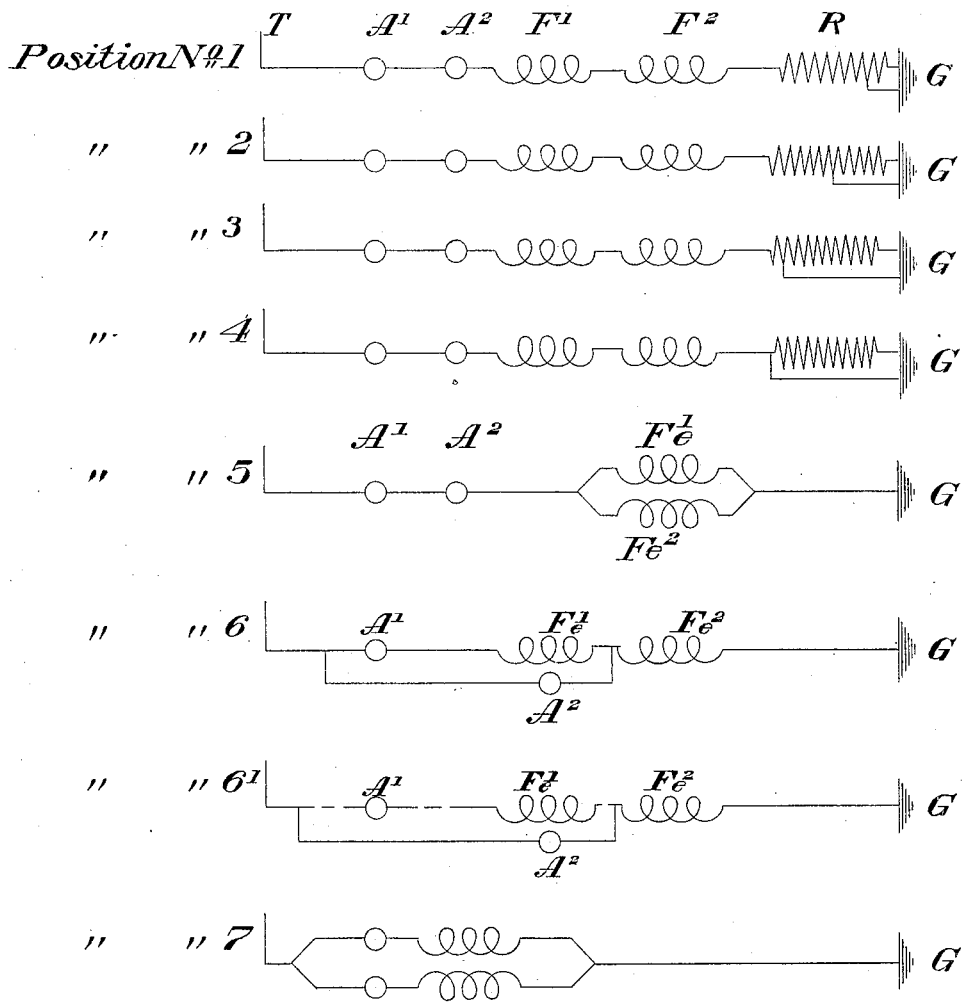
Figure 3:
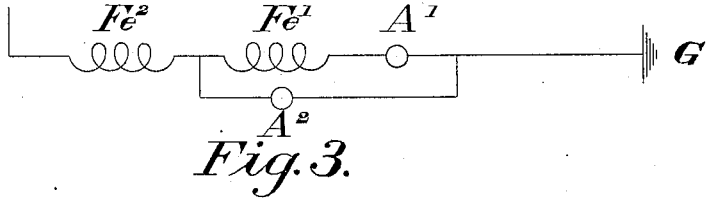

Figure 1 is a diagram showing a controller and connections suitable for carrying my invention into practice. Fig. 2 is a view showing graphically the circuit conditions at the different positions of the controlling-switch, and Fig. 3 is a graphical representation of a modified arrangement of the motor elements in the sixth position or step.

In the figures, Nos. 1 and 2 designate two electric motors, whose field-coils are further designated, respectively, as $Fe'$ and $Fe^2$ and their armature-coils as $A'$ and $A^2$.

C designates the regulating-switch of the controller, and RS the combined reversing and cut-out switch, both of which are of the well-known rotary type and need not be specifically described. The switch C has the seven running positions indicated by the vertical lines 1, 2, 3, 4, 5, 6, and 7, and the switch RS has the seven positions indicated, respectively, as " No. 1 back," " No. 1 ahead," "ahead," "off," "back," "No. 2 back," and "No. 2 ahead." The switch C has a plurality of movable contacts designated $c\ c'\ c^2\ c^3$, &c., to $c^{27}$, inclusive, and a plurality of stationary contact-fingers $F\ F'\ F^2$, &c., to $F^{12}$, inclusive. The contact-fingers of the reverse-switch are designated $F^{13}\ F^{14}$, &c., to $F^{25}$, inclusive. The only movable contacts of this switch which it will be necessary to refer to specifically herein are those which are on the vertical line marked "ahead" and are designated as $z\ z'\ z^2$, &c., to $z^{10}$, inclusive.

BOC indicates a blow-out coil; T, the trolley connection; CS, a canopy-switch; FB, a fuse-box; LA, a lightning-arrester, and CC a choke-coil.

R indicates artificial resistance for connection in the motor-circuit at starting.

G whenever seen indicates a ground connection.

The various electrical connections are clearly indicated in Fig. 1 and need not be specifically described.

When the switch C is moved to position 1, the circuit is from the trolley to blow-out coil, to finger $F^{12}$, contacts $c^{24}\ c^{22}$, to finger $F^{11}$, to finger $F^{25}$, to contacts $z^{10}\ z^9$, finger $F^{24}$, to armature $A'$, to finger $F^8$, to contacts $c^{16}\ c^{19}$, to finger $F^9$, to finger $F^{22}$, contact $z^8$, finger $F^{23}$, armature $A^2$, finger $F^6$, contacts $c^{11}\ c^{12}$, finger $F^7$, finger $F^{21}$, contacts $z^7\ z^5$, finger $F^{19}$, field $Fe'$, finger $F^{20}$, contacts $z^6\ z^4$, finger $F^{18}$, finger $F^4$, contacts $c^6\ c^8$, finger $F^5$, finger $F^{14}$, contacts $z\ z^2$, finger $F^{16}$, field $Fe^2$, finger $F^{15}$, contacts $z'\ z^3$, finger $F^{17}$, finger $F^2$, to and through resistance R, to finger, to ground on motor-frame. The motors are now in full series with all the resistance in circuit. At position 2 the finger F engages the contact $c$, and thereby short-circuits a portion of the resistance by providing a path to ground through the controller-shaft. At position 3 the engagement of finger $F^2$ with contact $c'$ short-circuits a further section of resistance, and at position 4 the engagement of finger $F^2$ with the contact $c^2$ short-circuits the entire resistance. At position 5 the current after passing through the two armatures in series by the path above traced out returns to finger $F^6$ and divides between the contacts $c^{11}$ and $c^{12}$, one part passing by finger $F^7$ to and through field $Fe'$ by the path above traced and the other part passing to and through field $Fe^2$. The return from the field $Fe'$ is to the connected fingers $F^4$ $F^3$ to ground through the contact $c^4$, and the return from the field $Fe^2$ is to finger $F^2$ and to ground through the contact $c^3$. In this position, therefore, the two fields are in multiple with each other, but are in series with the series armatures, and no resistance is in circuit. As thus far described the circuit positions are similar to those employed in the No. 38 controller manufactured by The Lorain Steel Company, and I make no claim thereto, except in combination with the succeeding steps. At position 6 the circuit is from the blow-out coil to finger $F^{12}$, contacts $c^{23}$ $c^{25}$, to the connected fingers $F^{11}$ $F^{10}$. Here the current divides, one path being by finger $F^{11}$ to finger $F^{25}$, contacts $z^{10}$ $z^9$, finger $F^{24}$, armature $A'$, finger $F^8$, contacts $c^{17}$ $c^{14}$, finger $F^7$, finger $F^{21}$, contacts $z^7$ $z^5$, finger $F^{19}$, field $Fe'$, finger $F^{20}$, contacts $z^6$ $z^4$, finger $F^{18}$, finger $F^4$, contacts $c^7$ $c^{10}$, finger $F^5$, finger $F^{14}$, contacts $z$ $z^2$, finger $F^{16}$, field $Fe^2$, finger $F^{15}$, contacts $z'$ $z^3$, finger $F^{17}$, finger $F^2$, to ground through contact $c^3$. The other path is from finger $F^{10}$ to the contacts $c^{20}$ $c^{21}$, to finger $F^9$, to finger $F^{22}$, to contact $z^8$, to finger $F^{23}$, to armature $A^2$, to finger $F^6$, and by means of the overhanging contact $c^{13}$ to contacts $c^7$ $c^{10}$, where it joins the other path. In this position, therefore, the field-coils of the two motors and the armature of one motor are connected in series, while the other armature is connected in parallel with said motor. To pass from position 6 to the position of full multiple, which occurs at position 7, all that is necessary is to disconnect the No. 1 motor from circuit and then reconnect it in multiple with the No. 2 motor. Inasmuch, however, as the No. 1 motor is carrying considerable current at this time, it is desirable to break the circuit of this motor at as many points in series as possible. Therefore in passing from position 6 to position 7 finger $F^4$ $F^7$ $F^8$ $F^{11}$ $F^{12}$ lose engagement with their respective contacts $c^7$ $c^{14}$ $c^{17}$ $c^{23}$ $c^{25}$, which breaks the circuit of motor No. 1 at five different points in series. This position is indicated at 6' in Figs. 1 and 2. At position 7 these fingers engage the respective contacts $c^{10}$ $c^{15}$ $c^{18}$ $c^{26}$ $c^{27}$, and the circuit is from the blow-out coil to fingers $F^{12}$ $F^{10}$, contacts $c^{27}$ $c^{26}$, thence to finger $F^{11}$, and contacts $c^{21}$ $c^{20}$, the current passing in multiple from fingers $F^{11}$ $F^9$ through the two armatures by the path, substantially as indicated in position 6, the return from the respective armatures being to fingers $F^8$ and $F^6$. From the finger $F^8$ the current passes to contacts $c^{18}$ $c^{15}$, to finger $F^7$, thence to and through field $Fe'$, the return being to fingers $F^4$ $F^3$ and to ground through the contact $c^5$. From the finger $F^6$ the current passes to contacts $c^{13}$ $c^{10}$, to finger $F^5$, thence to and through field $Fe^2$, the return being to finger $F^2$ and to ground through the contact $c^3$. The two motors are now connected in full multiple.

The circuit relation effected at position 6 I believe to be a novel one in the control of two electric motors, and while it is particularly adapted for use in the system above described between the position of multiple fields and full multiple it may be combined with other and different steps. It affords a considerable acceleration in speed over the circuit relation of position 5, but guards against undue acceleration not only by reason of the ohmic resistance of the series-connected fields and armature, but also by reason of the counter electromotive force due to the strong field of the motor whose armature is in parallel with the other motor. It also facilitates the change to full multiple, owing to the fact that the shunted motor can be readily cut out and reconnected in parallel without other preliminary circuit changes. This step may, however, be effected in other ways. The position also prevents any tendency of the motors to buck, and the change to position 7 does not result in a too-great acceleration in speed.

It is obvious that if the motors are connected, as shown in Fig. 3, in the sixth position the effect will be the same as with the connection shown in Fig. 2.

I do not limit myself to the use of the particular controller herein shown and described, since my improved method of control may be carried out by means of any suitable controller.

Having thus described my invention, what I claim, and desire to secure by Letters Patent, is—

1. In a system of series-parallel control for two electric motors, the step which consists in connecting the field-coils of both motors and the armature of one motor in series with each other and the armature of the other motor in shunt or parallel with the first-named motor.

2. In a system of series-parallel control for two electric motors, the method of shifting the motors from a circuit relation wherein their fields are in parallel and their armatures in series, to a full parallel relation, which consists in connecting the field-coils of both motors and the armature of one motor in series, and the armature of the other motor in shunt with the first-named motor.

3. In a system of series-parallel control for electric motors the method of passing from a position of parallel fields and series armatures to a full multiple position, which consists in shunting one motor with the armature of the other motor, and at the same time increasing the field strength of the motor whose armature forms such shunt, and then connecting the two motors in parallel.

4. The method of controlling a pair of electric motors which consists in starting the motors connected in series, then connecting the fields in parallel and the armatures in series, then connecting the fields and one armature in series and the other armature in shunt to the field and armature of the other motor, and then connecting the two motors in parallel.

5. The method of controlling a pair of electric motors, which consists in starting them from a position of rest connected in series with each other and with artificial resistance, then reducing the amount of said resistance and finally removing it entirely from circuit, then connecting the fields in parallel, with the armatures in series with each other and with the parallel fields, then connecting the fields and one armature in series and the remaining armature in parallel with the field and armature of the other motor, and finally connecting the two motors in full parallel.

6. In the control of electric motors, the method of changing the motors from a relation in which the fields are in parallel and the armatures are in series with each other and with the fields to a relation in which the motors as a whole are in parallel, which consists in connecting the field of one motor in series with the second motor, and its armature in parallel with said second motor, and then disconnecting said second motor from circuit and reconnecting it in parallel with the other motor.

7. The method of controlling a pair of electric motors, which consists in starting them from a position of rest connected in series with each other and with artificial resistance, then reducing the amount of said resistance and finally removing it entirely from circuit, then connecting the fields in parallel, with the armatures in series with each other and with the parallel fields, then connecting the two fields and one armature in series and the remaining armature in parallel with the field and armature of the other motor, then removing said other motor temporarily from circuit and reconnecting it in parallel with the first motor.

In testimony whereof I have affixed my signature in presence of two witnesses.

FRANK W. GARRETT.

Witnesses:
   B. M. SMITH,
   H. W. SMITH.